United States Patent [19]
Knuth et al.

[11] Patent Number: 6,101,808
[45] Date of Patent: Aug. 15, 2000

[54] CRYOGENIC SOLID HYBRID ROCKET ENGINE AND METHOD OF PROPELLING A ROCKET

[75] Inventors: William H. Knuth, Madison; Eric E. Rice, Middleton, both of Wis.; Darin R. Kohles, Atlanta, Ga.; Christopher P. St. Clair; Daniel J. Gramer, both of Madison, Wis.

[73] Assignee: Orbital Technologies Corporation, Madison, Wis.

[21] Appl. No.: 09/321,231

[22] Filed: May 27, 1999

Related U.S. Application Data

[60] Provisional application No. 60/087,163, May 29, 1998.

[51] Int. Cl.⁷ ...................................................... F02K 9/28
[52] U.S. Cl. ............................................... 60/251; 60/204
[58] Field of Search ....................................... 60/251, 204

[56] References Cited

U.S. PATENT DOCUMENTS 5,099,645  3/1992  Schuler et al. ............................. 60/219

*Primary Examiner*—Timothy S. Thorpe
*Assistant Examiner*—Ehud Gartenberg
*Attorney, Agent, or Firm*—Dorsey & Whitney LLP

[57] ABSTRACT

A cryogenic solid hybrid engine with a solid propellant chamber, a first propellant within such chamber in which the first propellant is in solid form in the chamber and is in fluid form at room temperature, a coolant fluid chamber and a coolant fluid in the coolant fluid chamber being maintained at a temperature blow the freezing point of the first propellant. The invention also relates to a method for propelling a rocket and a method for forming a solid propellant grain for use in a cryogenic solid hybrid rocket engine.

20 Claims, 4 Drawing Sheets

CRYOGENIC SOLID HYBRID ROCKET ENGINE AND METHOD OF PROPELLING A ROCKET

This application claims the benefit of Provisional Application Ser. No. 60/087,163, filed May 29, 1998.

This invention was made under contract with the United States Air Force "Contract No. F29601-92-C-0071".

BACKGROUND OF THE INVENTION

1. Field of the Invention

The present invention relates generally to cryogenic hybrid rocket engines and propellant combinations, and more particularly to a hybrid rocket engine utilizing a grain of "solid" fluid that is normally a liquid or gaseous fluid at room temperature at atmospheric pressure in combination with a fluid propellant. The invention also relates generally to a method of propelling a rocket utilizing a solid propellant and a liquid or gaseous propellant in an engine form commonly referred to as a hybrid rocket engine and a method of forming the solid propellant grain in such an engine.

2. Description of the Prior Art

Conventional hybrid rocket engines comprise, by definition, a grain of a solid propellant and a separate liquid propellant. These engines commonly comprise a solid fuel or propellant which is in its solid state at room temperature in combination with a second propellant in a liquid or fluid state. One problem with previous hybrid engines is that the choice of propellants for the solid grain has been limited to chemicals that are solid at room temperature. These chemicals do not produce high thrust per unit of mass flow and accordingly are classed as low performance propellants. A need exists for providing high-performing cryogenic propellants in their solid form in a hybrid rocket engine. A problem with this, however, is how to deliver the solid propellant in solid form, to the combustion chamber and how to maintain the solid propellant, which is gaseous or liquid at room temperature, in its solid form as well as to maintain the liquid propellant at its desired temperature. A further problem is that propellants commonly used for existing hybrid rocket propellant grains do not have the ability to capture and retain highly energetic atoms, or free-radicals or energetic molecules that impart significant energy density benefits to rocket performance. Propellant grains that have the ability to capture such high energy density materials (HEDMs) are needed to improve performance of hybrid rockets for low-cost access to space.

Accordingly, there is a need in the art for an improved cryogenic hybrid rocket engine which avoids or minimizes the above problems, captures the desired new capabilities and simplifies the engine structure.

SUMMARY OF THE INVENTION

In contrast to the prior art, the present invention utilizes a first propellant which is normally in a fluid state, either a gas or liquid, at room temperature, but which is utilized in its solid/frozen form. This solid propellant is combined and burned with a second fluid propellant (either gas or liquid) in the combustion chamber to which produce hot combustion gases that provide the engine thrust. In the preferred embodiment, the second fluid propellant, usually in the form of a liquid, is used to freeze the first propellant into its solid form and to maintain the solid propellant in its solid state until combustion in one or more sequential stages of combustion. In the preferred embodiment, the solid propellant defines a portion of the primary combustion zone. The details of the engine structure, the identification of various solid and liquid propellant combinations and the general concept of the present invention are set forth below.

More specifically, the cryogenic engine in accordance with the present invention utilizes a generally central annular grain of solid propellant which is frozen into a combustion or propellant chamber or onto the chamber wall and/or maintained in its solid frozen state by a cooling fluid which at least partially surrounds the central solid propellant grain chamber; the hybrid approach accommodates the addition of HEDM. Preferably, this cooling fluid is a second or fluid propellant. This avoids the need for any additional structure or additional means to maintain the solid propellant, which is normally a gas or liquid at room temperature, in its solid form. The annular grain is frozen in a form that includes a hollow center passageway or port. Partial combustion within the port in the solid grain frees the propellant from its solid state and provides the means to sustain delivery of such propellant to the combustion process in the chamber.

Several advantages are achieved by the structure and concept of the present invention. First, the present invention relates to an improved method of making the solid propellant grain either from a gas phase or from a liquid phase as disclosed below.

Secondly, some embodiments of the concept of the invention involve use of the cold liquid second propellant to form or freeze the solid first propellant and to maintain the solid first propellant in its solid state. Such embodiments of this engine design includes a central chamber having a chamber wall or other substrate on or within which the solid fuel can form and an outer housing or chamber surrounding at least a portion of the central chamber and containing the liquid or coolant fluid, typically the second propellant, which is at a temperature low enough to solidify the solid first propellant. To facilitate this, the temperature of the cooling propellant or fluid must be below the freezing point of the propellant to be solidified.

Thirdly, with certain embodiments of the invention, delivery of the liquid propellant can be achieved as a result of self-pressurizing. In other words, as it is heated, the liquid propellant vapor pressure increases, thereby creating the necessary pressure in the liquid propellant tank for delivery of the liquid or second propellant to the combustion chamber.

Fourthly, the concept of the present invention includes the option to use multiple combustion zones and therefore provides the ability to operate over a relatively large throttle range by combining a flow of the fluid state propellant into the top of the combustion chamber with the possibility of an aft injection flow into a secondary combustion zone as well.

Still further, the concept of the present invention enables the engine to be shut off and restarted and to better maintain flexibility and oxidizer/fuel (O/F) ratio control by regulating the flow of the fluid state propellant into the port of the solid state propellant.

The structure of the hybrid rocket engine in accordance with the present invention can be summarized and described as follows:

A cryogenic solid hybrid rocket engine comprising:
  a solid propellant chamber having an inlet opening and an exhaust opening;
  a first propellant within the solid propellant chamber, in which the first propellant is in solid (frozen) form within the solid propellant chamber and is of a type which exists in a fluid form (gas or liquid) at or about room temperature (70° F.);

a second chamber at least partially surrounding the solid first propellant chamber; and a second propellant or coolant in fluid form in the second chamber, with the second propellant being maintained at a temperature, or preferably having a boiling point, below the triple point temperature (freezing point) of the first propellant so that the second propellant can effectively function to freeze the first propellant directly from gas to solid state without passing through the liquidity region and/or maintain the first propellant in a solid form.

Further preferred features of the rocket engine described above include a valve at the solid propellant chamber inlet opening to control the flow of second propellant into the solid first propellant chamber and a secondary or aft combustion chamber adjacent to or downstream from the exhaust opening of the solid propellant chamber. Ignition means suitable to the propellants are also provided.

The method aspect of the present invention can be summarized and described as follows:

A method of propelling a rocket comprising the steps of:

providing a cryogenic solid hybrid engine of the type having a first propellant chamber with an inlet and an exhaust opening and a second propellant chamber adjacent to or at least partially surrounding the first chamber;

introducing a liquid coolant (which may be the second propellant) into the second chamber;

introducing a first propellant into the first chamber and forming the first propellant into solid form, with the liquid coolant being maintained at a temperature, or preferably having a boiling point, below the freezing point of the first propellant and the first propellant being such that it exists as a fluid (gas or liquid) at about room temperature;

introducing a second propellant into the port of the first propellant and second propellant; and igniting the propellants.

The ensuing combustion vaporizes the solid propellant from its surface in the center port, thereby providing a continuing supply of the first propellant to the combustion process.

The combustion products of the ignition/combustion of the propellants are expelled from the first propellant chamber and secondary combustion chamber, if used, to produce the rocket thrust.

The liquid coolant in the above method is effective to freeze the first propellant. In certain preferred embodiments, the liquid coolant is a second propellant which is introduced into the first chamber to react with the first propellant during combustion.

Accordingly, the present invention relates to a cryogenic hybrid rocket engine in which the solid propellant grain defines a portion of the combustion zone.

Another object of the present invention is to provide a cryogenic hybrid rocket engine in which the first propellant is formed into a solid, and/or maintained in solid form, on a chamber wall by a liquid second propellant which preferably is designed to react with the solid first propellant during combustion.

Another object of the present invention is to provide a cryogenic hybrid rocket engine in which the solid propellant is formed into a solid and/or maintained in solid form on a chamber wall by a liquid coolant fluid which is designed to be combined with the solid propellant during combustion with a third propellant.

Another object of the present invention is to provide a cryogenic rocket hybrid engine in which the atmospheric pressure boiling point or temperature (sub-cooled) of the cooling fluid and/or liquid propellant is less than the freezing temperature of the solid propellant.

A further object of the present invention relates to a method of forming the solid propellant grain in a hybrid rocket engine, either from a liquid or directly from a gas to a solid.

A still further object of the present invention is to provide a method of propelling a rocket utilizing the structure described above.

These and other objects of the present invention will become apparent with reference to the drawings, the description of the preferred embodiment and the appended claims.

DESCRIPTION OF THE PREFERRED EMBODIMENT

Figure 1:
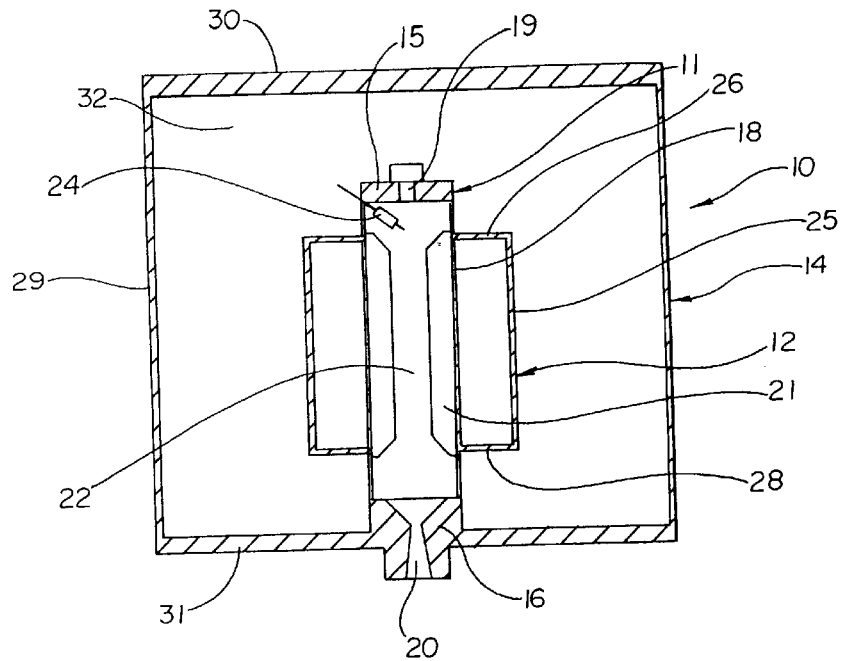
FIG. 1 is a schematic illustration of the cryogenic solid hybrid rocket engine concept of the present invention.

A basic concept of the cryogenic hybrid rocket engine of the present invention is to freeze a propellant or propellant mixture which is normally a gas or a liquid at room temperature into a solid propellant fuel or oxidizer grain and cause that propellant to combust with a second propellant. Solid propellant grains can also be formulated that contain solid particles, solid or porous structures or wires. These particles or structures may not be fluid at room temperature. Accordingly, for solid propellants containing such other particles or structures, at least a portion must exist as a fluid at room temperature. Freezing such a propellant is accomplished by providing cooling below its freezing point. This solid grain is then combusted with another propellant (either a liquid or gas), and the product combustion gases are exhausted through a nozzle to produce thrust. One unique feature is that the second propellant or other cooling fluid is used to maintain the solid cryogen in its frozen/solid form. In a preferred structure, the second propellant functions as the cooling fluid and thus is later used to provide the fuel or oxidizer addition that contributes to the thrust of the engine via the combustion or heating process in the chamber.

Examples of propellants that have been frozen into a solid grain by applicants and then combusted include: hydrogen, oxygen, oxygen-aluminum, methane, methane-aluminum, carbon monoxide, kerosene and acetylene. Additional basic propellants that may also be used for this process include: hydrogen peroxide, ethanol, methanol, propane, ethylene, butane, pentane, other hydrocarbons, hydrocarbon mixtures (e.g. natural gas), nitrogen tetroxide, ammonia, fluorine, fluorine-oxygen mixtures, $ClF_3$, $N_2O$, among others. Additions to these propellants for the improvement of rocket performance can include atomic or molecular lithium, boron, aluminum, silicon, carbon, magnesium, beryllium, etc. Ozone is also a possible additive for solid oxygen. The thermally compatible combinations of basic propellants that applicants have tested one or more of include: solid hydrogen/liquid helium/gaseous oxygen; solid oxygen/gaseous hydrogen (with LHe coolant); solid methane/gaseous oxygen (with LHe and $LN_2$ coolant); solid methane/aluminum/gaseous oxygen (with LHe coolant); solid carbon monoxide/gaseous oxygen (with LHe coolant); and solid acetylene/gaseous oxygen (with $LN_2$ coolant).

In accordance with the present invention, a coolant fluid/propellant is used to freeze the solid propellant grain. Preferably, the boiling point of this coolant fluid must be below or the temperature must be maintained below, the triple point temperature (or freezing point) of the propellant to be solidified to avoid liquid phase formation. For example, liquid hydrogen may be used to freeze oxygen because the normal boiling point of liquid hydrogen is 20 K., while the freezing point of oxygen is 54 K. Further, coolant fluid which freezes the first propellant may either be the second propellant and become part of the combustion process and contribute to thrust such as liquid hydrogen or liquid oxygen, or it may be an inert substance which does not enter into the combustion process. Also, the coolant fluid may be sub-cooled (by using lower holding pressure) to accommodate lower freezing points of the solid propellant.

The propellant grain may be frozen either directly from the gas phase or from the liquid phase. In the gas phase freezing, the propellant is introduced as a low-pressure gas (below its triple point pressure) to the continuously cooled grain chamber; the gas entering to be frozen can be pre-chilled or introduced at any other reasonable temperature. When the gas encounters the cold wall of the grain chamber or prefabricated solid material, it beings freezing smoothly directly to the wall or to the solid propellant grain that is already on the wall or to a previously placed solid material/matrix that is solid at room temperature or a previously frozen inert gas that has been placed there for a chemical or thermal insulation (e.g., nitrogen). As the freezing continues the rate slows down because of the insulative effect of the grain thickness buildup. Any cracks that may form in the grain may be automatically filled by the continuing gas freezing process. Formation of the liquid phase of the cryogen is prevented by maintaining the pressure of the working gas in the freezing chamber below its triple point pressure. The chamber is isolated from the atmosphere or vacuum of space during the freezing process. To add energetic species to the basic grain, they can be added and co-deposited by gas phase freezing or intermediate depositing such as sputtering, plasma jets, etc. In liquid phase freezing, the propellant is introduced to the grain chamber as a liquid, a gelled mixture of fine particles (e.g., Al, B) in the liquid, or the liquid can be frozen into a prefabricated solid matrix and pre-placed into the chamber. A mandrel is necessary to maintain an open port down the length of the grain for freezing from the liquid state; this was successfully demonstrated by using kerosene and aluminum powder with liquid nitrogen as the freezing medium. Liquid propellant is continually supplied to the freezing process to make up for shrinkage until the solid grain formation is complete.

The structure of the cryogenic hybrid rocket engine in accordance with the present invention is illustrated in the drawings. The basic engine concept for the engine in accordance with the present invention is shown in FIG. 1. In FIG. 1, the engine 10 includes an inner or solid propellant chamber 11, a cooling chamber 12 and a vacuum chamber 14 encasing the chambers 11 and 12.

The solid propellant or grain chamber 11 includes an inlet end 15 which includes an inlet opening 19 for selectively permitting the inflow of a second gaseous or liquid propellant and an outlet end 16 including an outlet thrust nozzle 20. The chamber 11 further includes a solid propellant chamber wall or side wall 18 extending between the inlet end 15 and the outlet end 16 and functioning to support a first propellant grain in the form of a solid, frozen cryogen 21. In the preferred embodiment of the concept drawing of FIG. 1, the side wall 18 embodies a generally cylindrical configuration with an inside attachment surface on which the solid or first propellant 21 is formed. As illustrated, the solid propellant 21 is formed on an interior surface of the wall 18 and extends inwardly a distance less than the radius of the cylindrical wall 18 so that a cylindrical central opening 22 exists within the propellant grain 21.

The grain 21 functions in part to define a first combustion zone to support combustion within the engine 10. Positioned below the opening 22 and the grain 21, but still within the chamber 11, is a second combustion zone where combustion can continue, or be initiated, during operation of the engine.

Positioned near the inlet end 15 of the chamber 11 is an ignitor 24 which is designed to be selectively activated. When activated, the ignitor 24 functions to ignite the propellants within the chamber 11.

The coolant or second chamber 12 is adjacent to the outer surface of the side wall 18 and surrounds or encompasses at least a portion of the chamber 11. In the preferred embodiment of FIG. 1, the cooling chamber 12 is a generally annular structure extending completely around the exterior of the wall 18 of the chamber 11, but is spaced inwardly from the inlet end 15 and outlet end 16. Accordingly, the chamber 12 includes an outer wall 25, a top wall 26 and a bottom wall 28. The top and bottom walls are generally dome-shaped and are connected at their outer edges to ends of the wall 25 and at their inner edges to the exterior surface of the wall 18. In the preferred embodiment, the wall 25 is a generally cylindrical wall which is spaced outwardly from, and concentric with the wall 18; however, a spherical or other shaped wall can be utilized as well. The connections between the walls 25, 26 and 28 are sealed to define an inner chamber capable of withstanding high pressures.

The entirety of the chambers 11 and 12 are encased within the vacuum chamber 14. The vacuum chamber 14 includes a side wall 29, a top wall 30 and a bottom wall 31 which are joined together in sealing relationship to form a vacuum chamber 32 that serves as insulation for the chamber 12.

The solid propellant grain 21 is in its solid form when existing in the engine as shown in FIG. 1, but which is normally a gas or a liquid at room temperature. Examples of materials that can be used to form the solid propellant 21 include: hydrogen, oxygen, methane, methane-aluminum, carbon monoxide, kerosene, acetylene, hydrogen peroxide, methanol, propane, ethylene, butane, pentane and various hydrocarbons and hydrocarbon mixtures (e.g., natural gas), nitrogen tetroxide, ammonia, fluorine, fluorine-oxygen mixtures, $ClF_3$, $N_2O$, among others. The coolant chamber 12 is filled with liquid coolant whose boiling point is preferably lower than or which is maintained at a temperature below, the freezing point of the propellant for the solid grain 21.

In addition to requiring the cooling fluid in the chamber 12 to be maintained at a temperature below the freezing point of the solid propellant 21, the coolant fluid in the chamber 12 may be either an inert material such as nitrogen or helium which does not take part in the combustion process or it may comprise a second propellant which is subsequently supplied to the combustion or solid propellant chamber 11 during the combustion process.

Figure 2:
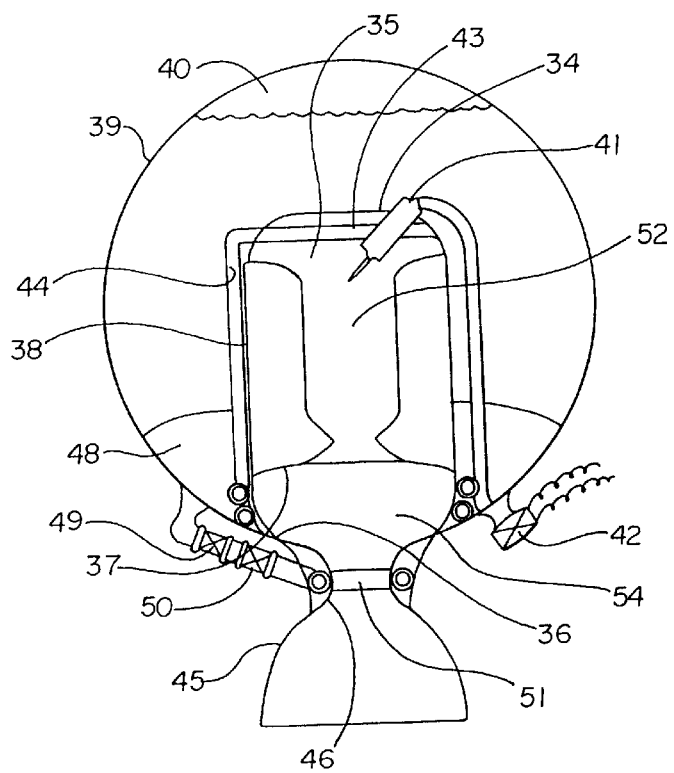
FIG. 2 is a schematic design of a self-pressurizing hybrid rocket engine in accordance with the present invention.

FIG. 2 illustrates a self-pressurizing, pressure fed hybrid rocket engine in which the coolant fluid also functions as the second propellant. The engine of FIG. 2 includes a first or solid propellant chamber 34 having an inlet end 35, an outlet or exhaust end 36 and a side wall 38. The side wall 38 extends between the ends 35 and 36 and defines a generally cylindrical chamber 34. Surrounding the chamber 34 is a tank or enclosure 39 defining a second or liquid propellant chamber 40. This chamber 40 contains a supply of a second or liquid propellant which, in the embodiment of FIG. 2, also functions as the cooling fluid. Thus, the supply of liquid propellant in the chamber 40 is in direct contact with the outer surface of the chamber wall 38 to be effective to freeze the solid propellant 37 onto the inner surface of the wall 38. Also included in the engine of FIG. 2 is an ignitor 41 positioned near the inlet end 35 and an ignitor control connector for selectively activating the ignitor 41. The second propellant is provided to the inlet end 35 of the chamber 34 by the main second propellant supply line 44. Preferably, the second propellant is provided to the inlet end 35 in a gaseous form through the main second propellant injector 43. Because of the structure of the engine of FIG. 2, the driving force supplying the second propellant to the injector 43 is supplied solely by the pressure within the chamber 40.

The exhaust end 36 of the chamber 34 is connected with an exhaust nozzle skirt 45 through the throat 46. The engine of FIG. 2 is also provided with a propellant retaining capillary screen 48, a tank shutoff valve 49, a thrust control valve 50 and a temporary throat plug 51.

Because the second propellant in the embodiment of FIG. 2 also serves as the cooling fluid, the second propellant should be maintained at a temperature below, or have a boiling point lower than, the freezing point of the solid propellant 37 in the chamber 34. This facilitates formation of the solid propellant grain on the inner surface of the chamber wall 38 similar to that described above with respect to FIG. 1. When formed, the solid propellant forms a generally annular configuration with a central opening defining a primary combustion zone 52 and a secondary combustion zone 54 below the solid propellant grain. In the embodiment of FIG. 2, the solid propellant is solid oxygen, while the liquid or second propellant is liquid hydrogen, although other propellants can be substituted.

Figure 3:
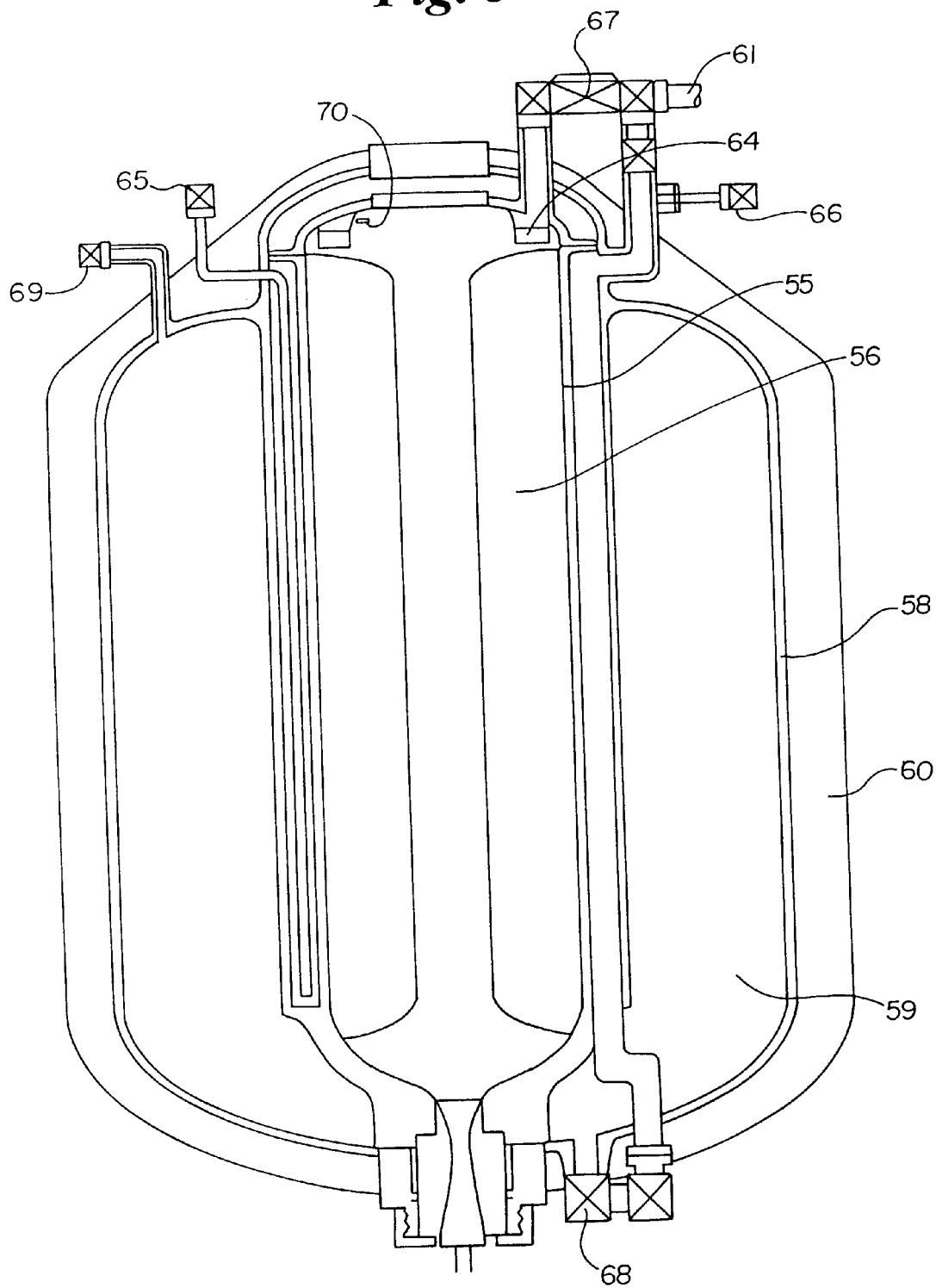
FIG. 3 is a cryogenic solid hybrid engine in which the cooling fluid is inert and the second propellant is delivered from an external source.

The engine of FIG. 3 utilizes a first solid propellant, a liquid coolant which is inert and does not enter into the combustion reaction and a second or fluid propellant which is provided to the combustion chamber from an external source. Specifically, the engine of FIG. 3 includes a solid propellant chamber defined by the side wall 55 which, like the engine of FIGS. 1 and 2, includes a generally annular configuration of solid propellant 56 on its inner surface. The solid propellant chamber is surrounded by a coolant chamber defined by the wall 58 and containing the liquid coolant 59. In this embodiment, the coolant is intended to be an inert material such as liquid helium and thus does not enter into the combustion reaction. The outside surface of the coolant chamber wall 58 is provided with appropriate insulation means which may be foam or vacuum. In the embodiment of FIG. 3, the gaseous second propellant is provided to the inlet end of the chamber 55 through the inlet 61 and the run valve 62. Injection of the liquid propellant in the embodiment of FIG. 3 is preferably accomplished by a suitable injector 64. The engine is provided with a coolant inlet valve 65, a coolant outlet valve 66, a coolant fill valve 68 and a coolant release valve 69. The inlet end of the chamber 55 is also provided with a selectively controlled ignitor 70.

In the embodiment of FIG. 3, the preferred solid propellant 56 is solid hydrogen, the preferred second or gaseous propellant supplied through the injector 64 is gaseous oxygen and the coolant fluid is liquid helium. In this embodiment, it is necessary for the cooling fluid such as liquid helium to be maintained at a temperature, or to have a boiling point, lower than the freezing temperature of the solid propellant such as hydrogen to facilitate forming the solid propellant grain along the inner surface of the chamber wall 55. In this particular embodiment, because the second propellant does not also function as the coolant fluid, no particular freezing point or boiling point relationship is necessary between the first and second propellants. This configuration is well-suited for the addition of HEDM to the solid hydrogen propellant grain.

Figure 4:
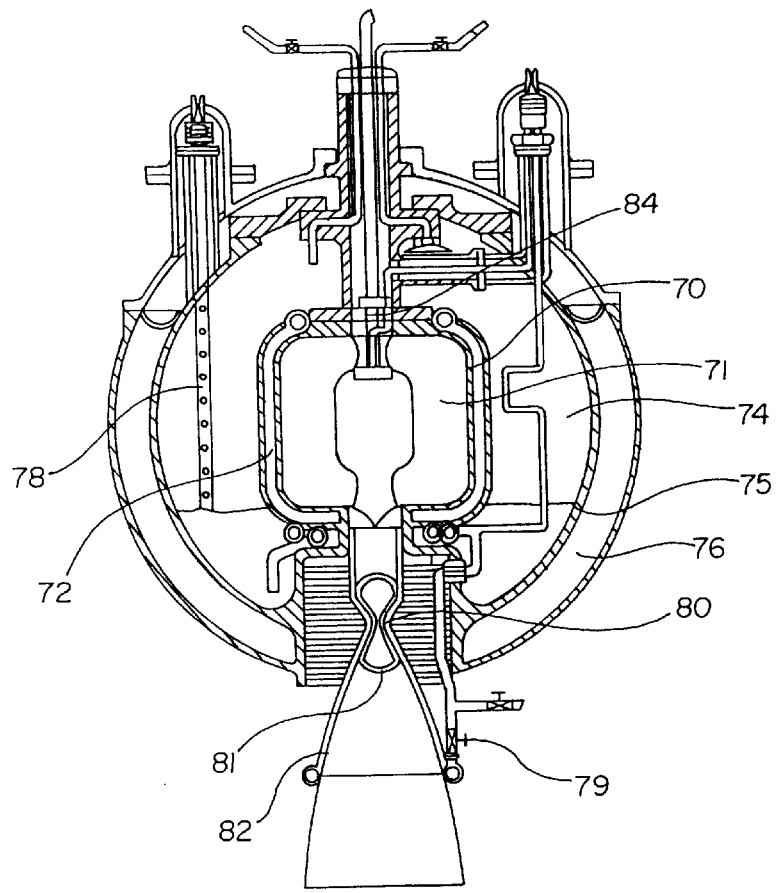
FIG. 4 is a more detailed engine design in which the second or liquid propellant also functions as the cooling fluid.

FIG. 4 is a more detailed illustration of a prototype engine in accordance with the present invention in which the second or liquid propellant also functions as the cooling fluid for the solid propellant. In FIG. 4, the solid propellant or grain chamber 70 has an internal surface provided with a solid propellant grain 71. Directly surrounding the chamber 70 is a grain housing coolant flow channel 72 containing liquid second propellant, with the main supply of second propellant being contained within the second propellant chamber 74 defined by the chamber wall 75. Positioned on the exterior of the wall 75 is a vacuum or insulation chamber 76 to insulate the housing wall 75; this could also be a foam insulation.

The engine of FIG. 4 is also provided with a second propellant level sensor 78, a main liquid propellant flow valve 79, a regeneratively cooled combustion chamber 80, an expandable throat plug 81 and an exit nozzle skirt 82.

In the embodiment of FIG. 4, an engine is illustrated in which the solid propellant grain is designed to be solid oxygen, while the liquid propellant in the chamber 74 is preferably liquid hydrogen, although other propellant combinations could be used. With this structure, the liquid hydrogen is under pressure sufficient to provide the second propellant to the interior of the chamber 70 through the injector head 84 in gaseous form. Because the second or fluid propellant in the design of FIG. 4 is also used as the cooling fluid, the propellant in the chamber 74 must be maintained at a temperature, or have a boiling point, lower than the freezing point of the solid propellant 71. This may be accomplished by insulation, periodic tank venting or other suitable means.

Figure 5A:
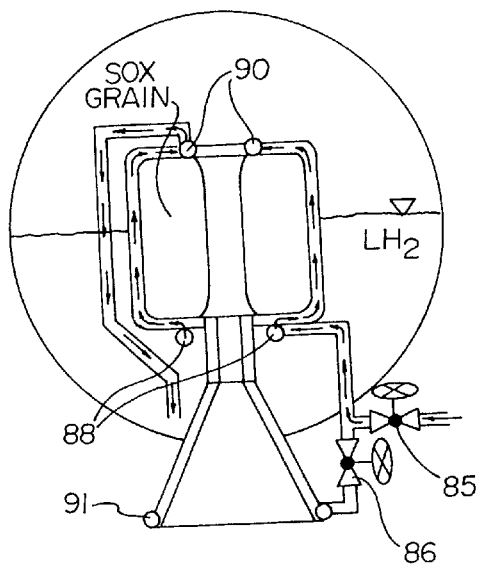
FIG. 5 comprises FIGS. 5a and 5b illustrating the flow schematic of grain freezing and firing operations.
Figure 5B:
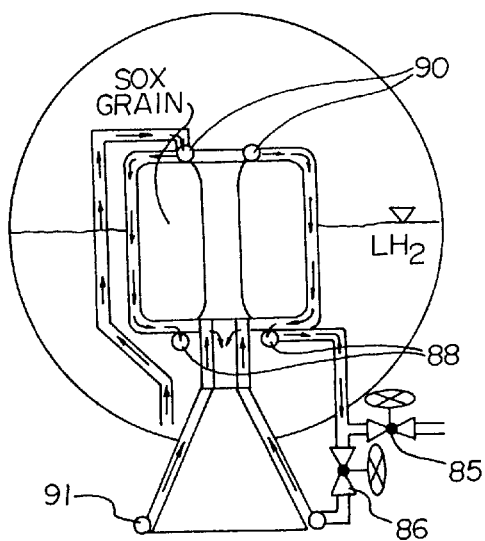

FIG. 5 comprises FIG. 5*a* showing the liquid propellant flow schematic for the cooled down/freezing/fill operation and FIG. 5*b* showing the liquid propellant flow schematic for the firing operation. FIGS. 5*a* and 5*b* include the liquid propellant tank fill valve 85, the liquid propellant main flow valve 86, the grain housing coolant bottom manifold 88, the solid propellant grain housing top coolant manifold 90 and the nozzle coolant inlet manifold 91.

The engine of FIG. 5 can be summarized as follows:

1. The liquid hydrogen engine fill valve is a remotely controlled, regulating valve which meters the liquid hydrogen flowing into the engine during the cooldown, fill, and grain formation processes.

2. The liquid hydrogen main flow valve 86 is a remotely controlled, on/off valve which controls the liquid hydrogen flowing into the aft combustion chamber during the firing process.

3. The grain housing bottom coolant manifold 88 distributes hydrogen flow to the base of cooling passages in the grain chamber.

4. The grain housing top coolant manifold 90 distributes hydrogen flow to the top of cooling passages in the grain chamber.

5. The nozzle coolant inlet manifold 91 receives liquid hydrogen during the firing process, and sends it towards the main (aft) injector.

During the freezing process, the valve 85 is used to meter the liquid hydrogen flowing into the engine. The $LH_2$ that passes through this valve is routed through the grain case cooling channels and eventually into the engine's hydrogen tank. Flow is controlled so as to maintain a constant level of liquid hydrogen in the engine tank. In this steady-state condition, the rate of hydrogen boil-off from heat leak and oxygen formation will equal the rate of hydrogen inflow. Gaseous hydrogen exits through one of the vents in the top of the engine hydrogen tank.

During the firing process, the valve 85 is closed. The direction of flow is reversed: hydrogen comes from the engine tank, passes through the grain case, and is controlled through the valve 86 to the combustion process. The amount of hydrogen flow is controlled by metering the pressure in the liquid hydrogen tank via a gaseous helium pressurization system.

Figure 6:
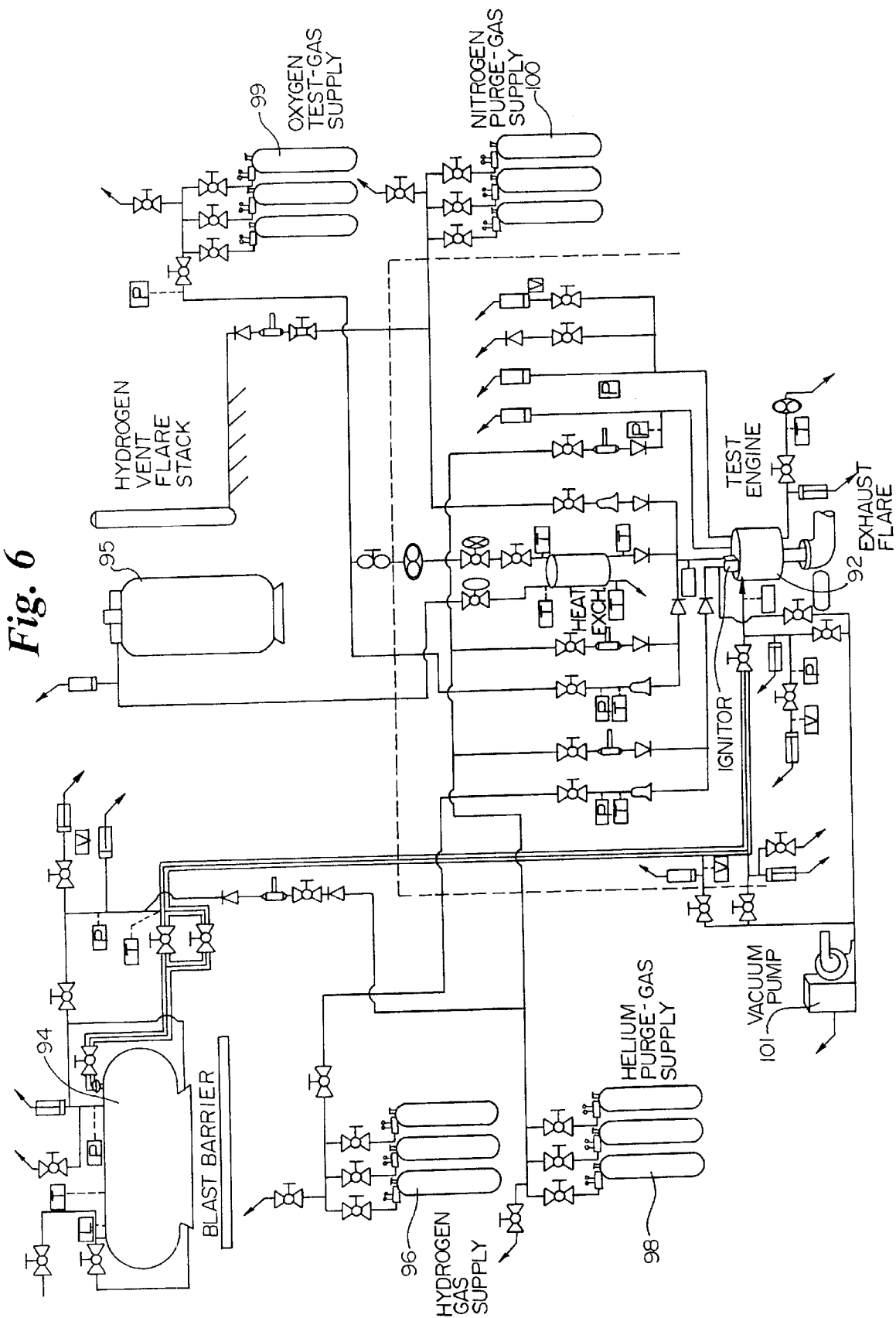
FIG. 6 is a facility flow diagram for the solid cryogenic rocket engine of the present invention.

FIG. 6 reflects a facility flow diagram for the engine 92 which includes a storage tank 94 for the liquid propellant such as liquid hydrogen, a storage vessel 95 for the cooling fluid such as liquid nitrogen, a hydrogen gas supply 96, a helium purge gas supply 98, an oxygen test gas supply 99, a nitrogen purge gas supply 100 and a vacuum pump 101.

When formation of the solid grain is complete and the grain has been brought to the desired temperature, the grain is ready to be combusted with a second liquid or gas propellant in the hybrid engine. The second propellant is delivered to the combustion process as a gas or a liquid. Combustion of the propellants may take place entirely within the grain chamber, entirely in a secondary combustion chamber, or in both chambers. Ignition of the propellants is accomplished with one or more hydrogen/oxygen augmented spark ignitors (spark plug, glow plug, laser, squib, etc.).

The combustion process rate is controlled by the fluid second propellant injection (gas or liquid) that can be of the same composition as the solid propellant grain or of a different propellant. The method of injection at the head end of the engine will affect the way the grain surface regresses. The velocity of the injection, the flux of the injector flow, the direction of injection, the extension of the injection point beyond part of the grain or shielding of the grain from the injection flow, and the initial temperature of the grain have all shown via testing to have an influence on the regression rate of the grain. Additionally, the amount or type of additive frozen into the grain can be used to tailor the regression rate. In a methane/aluminum grain for example, a gradient of aluminum can be used to provide constant mass flow rate of the grain material. The oxidizer to fuel (O/F) ratio can be controlled by controlling the injected propellant rate, if no aft injection is also used to control O/F ratio. It has been shown that there is a flow rate that will provide optimum rocket performance.

Melting or vaporization or erosion of the solid propellant grain will occur in the chamber. This determines the regression rate of the solid grain. The O/F ratio for the overall combustion process can accurately be controlled by head-end and aft-end rejection of a liquid or gaseous propellant into the secondary chamber, if there is one. To maintain the cold condition of the propellant near the chamber wall during the combustion of the grain, provisions are made to allow the coolant propellant to remove heat from the wall by being guided up the wall surface in channels on its way to provide combustion chamber and skirt regenerative cooling and final combustion. The chamber pressure control of the engine can be via a pressure-fed system or a pump-fed system largely depending on the size of the engine.

Formation of the solid propellant grain can be performed in an environment (i.e., the Earth's atmosphere or the high solar radiation environment of space) which is warmer than the freezing temperature of the grain and the liquid propellant/coolant. To conduct the freezing process successfully and efficiently, thermal insulation is necessary to minimize the heat input from the surrounding atmosphere or solar radiation environment to the grain and its liquid coolant supply. Techniques for thermal insulation include: vacuum jackets, radiation shielding, foam insulation, thermal isolation, active fluid refrigeration, and selection of low thermal-conductivity materials for construction of engine components.

This engine and combined propellants of the invention as described provide various benefits including the following:

First, the invention allows an increase in propellant/rocket safety by using the hybrid approach in which one of the propellants is a solid and cannot immediately contribute to a rapid deflagration or explosion in the case of an engine or vehicle failure.

Secondly, the invention provides for higher density and more energetic propellants, with additives that cannot be added except via the methods described herein at cold temperatures to provide stability. This can result in smaller, lower cost and higher performance rocket vehicles.

Thirdly, the invention provides improvement in overall rocket system performance and payload delivery capability. This results from the reductions in size and weight of the vehicle due to increased propellant density, improvements in specific impulse by the addition of energetic species, low cost, and simple pressure-fed or pump-fed engine designs, and efficient thermal and structural packaging of the liquid second propellant around the solid grain first propellant.

Fourthly, the invention provides the ability to load the propellants to an empty vehicle on the launch pad or in the launch location at the last possible moment. The invention also provides the ability to use certain propellants for in-situ space resource utilization (ISRU) applications (lunar and Mars) to reduce the cost of space transportation needed for manned or unmanned space exploration. Still further, the invention provides the ability to have high thrust hybrid rockets with much higher regression rates (10 to 40 times) than with conventional fuels. This allows cryogenic hybrids to be used for high-thrust, short duration applications not practical for conventional hybrid, solid or liquid fueled rockets. This also allows cryogenic hybrids to feature short length configurations not feasible with conventional solids or conventional hybrids.

Although the description of the preferred embodiment has been quite specific, it is contemplated that various modifications could be made to the preferred embodiment without deviating from the spirit of the present invention. Accordingly, it is intended that the scope of the invention be defined by the appended claims rather than by the description of the preferred embodiment.

What is claimed is:

1. A cryogenic solid hybrid rocket engine comprising:
   a solid propellant chamber having an inlet opening and an exhaust opening;

a first propellant within said solid propellant chamber in which the first propellant is in solid form within the solid propellant chamber and of a type in which at least a portion exists in a fluid form at or about room temperature;

a coolant fluid chamber at least partially surrounding said solid propellant chamber; and a coolant fluid in said coolant fluid chamber with said coolant fluid being maintained at a temperature below the freezing point of the first propellant so that said coolant fluid can effectively function to freeze said first propellant and/or maintain said first propellant in a solid form.

2. The rocket engine of claim 1 wherein said solid propellant chamber is defined by a solid propellant chamber wall having an interior wall surface and an exterior wall surface.

3. The rocket engine of claim 2 wherein said coolant fluid chamber is defined by a coolant fluid chamber wall surrounding said solid propellant chamber wall.

4. The rocket engine of claim 2 wherein said first propellant is solidified on said interior wall surface of said solid propellant chamber wall.

5. The rocket engine of claim 4 wherein said first propellant solidified on said interior wall surface includes an inlet end facing said inlet opening and an outlet end facing said exhaust end and defines a central opening.

6. The rocket engine of claim 5 wherein said first propellant central opening is a first combustion zone and wherein said rocket engine further includes a second combustion zone adjacent to said outlet end.

7. The rocket engine of claim 6 including an ignitor in one or both of said first and second combustion zones.

8. The rocket engine of claim 1 wherein said coolant fluid chamber is in selective communication with said inlet end.

9. The rocket engine of claim 8 including a selectively operated valve between said coolant fluid chamber and said inlet end.

10. The rocket engine of claim 9 wherein said coolant fluid is a second propellant.

11. The rocket engine of claim 1 wherein said coolant fluid is a second propellant.

12. The rocket engine of claim 1 wherein said first propellant is selected from the materials comprising one or more of hydrogen, oxygen, methane, methane-aluminum, carbon monoxide, kerosene, acetylene, hydrogen peroxide, ethanol, methanol, propane, ethylene, butane, pentane, nitrogen tetroxide, ammonia, fluorine, $ClF_3$, $N_2O$ and materials in which high energy density materials (HEDM's) are introduced into the solid grain of the first propellant during or after its formation, and where said first propellant serves as matrix to retain said HEDM's until the increased energy of the HEDM additives is released by the combustion process to enhance the performance of the engine and wherein said second propellant is a compatible fuel or oxidizer.

13. The rocket engine of claim 1 including an ignitor near said inlet end.

14. The rocket engine of claim 1 including a second propellant chamber and a second propellant in said second propellant chamber.

15. A method of propelling a rocket comprising the steps of:

providing a cryogenic solid hybrid engine of the type having a first chamber with an inlet and an exhaust opening and a second chamber at least partially surrounding the first chamber;

introducing a liquid coolant into the second chamber;

introducing a first propellant into said first chamber and forming said first propellant into solid form in said first propellant chamber, with the said liquid coolant having a temperature below the freezing point of the said first propellant and said first propellant being such that at least a portion of it exists as a fluid at about room temperature; and igniting said first propellant.

16. The method of claim 15 wherein said liquid coolant is a second propellant and wherein said method further includes introducing said second propellant into said first chamber and igniting said first and second propellants.

17. The method of claim 16 wherein said second propellant is introduced into said first chamber solely by the pressure within said second chamber.

18. A method of forming a solid propellant grain comprising the steps of:

providing a cryogenic solid hybrid engine of the type having a first chamber with an inlet and an exhaust opening and a second chamber adjacent to or at least partially surrounding the first chamber;

introducing a liquid coolant into the second chamber; and introducing a first propellant into said first chamber and forming the first propellant into solid form, with the liquid coolant being maintained at a temperature below the freezing point of the first propellant and the first propellant being such that it exists as a fluid (gas or liquid) at about room temperature.

19. The method of claim 17 wherein said first chamber is defined by a chamber wall having an interior side defining said first chamber and an exterior side exposed to said second chamber and said method includes introducing said first propellant into said first chamber in substantially a fluid form wherein said first propellant forms as a solid on said interior side of said chamber wall.

20. The method of claim 18 wherein said chamber wall is substantially cylindrical and wherein said first propellant forms as a solid and defines a central combustion zone.

* * * * *